Oct. 28, 1924.
T. N. BURGHART
AUTOMOBILE LOCK
Filed Sept. 12, 1922
1,513,218
3 Sheets-Sheet 1
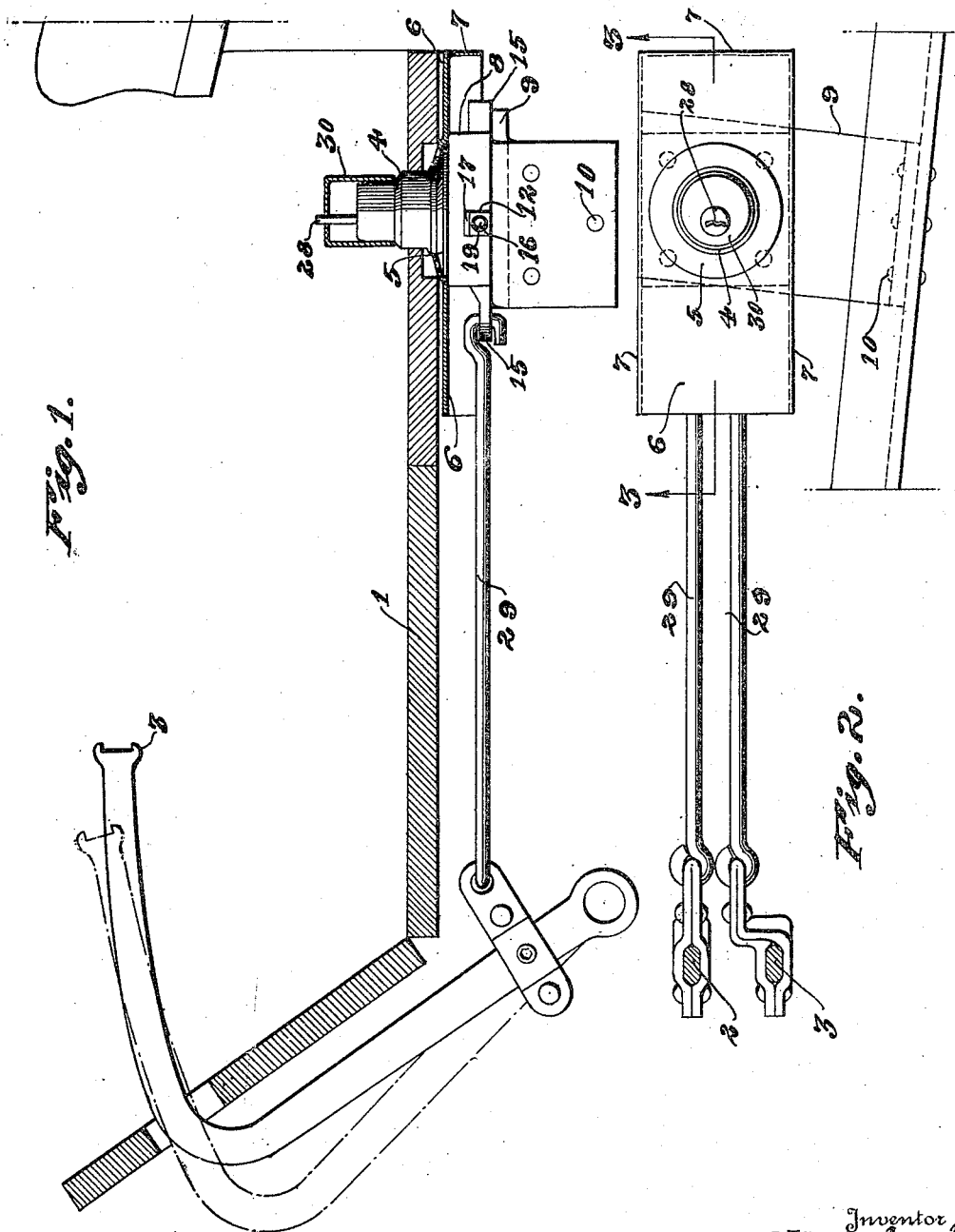

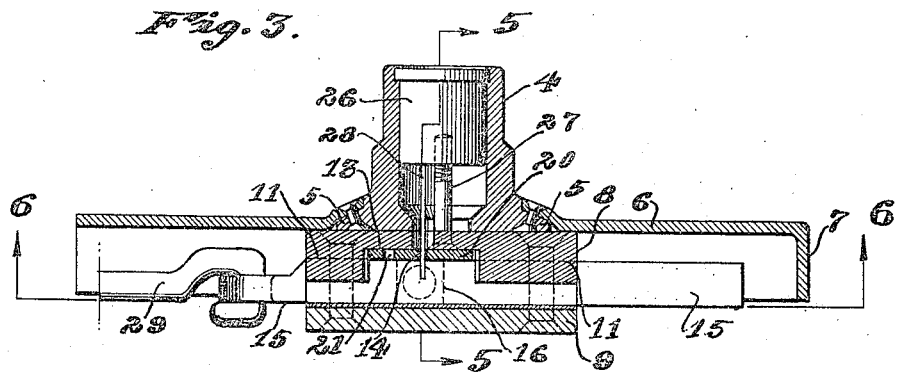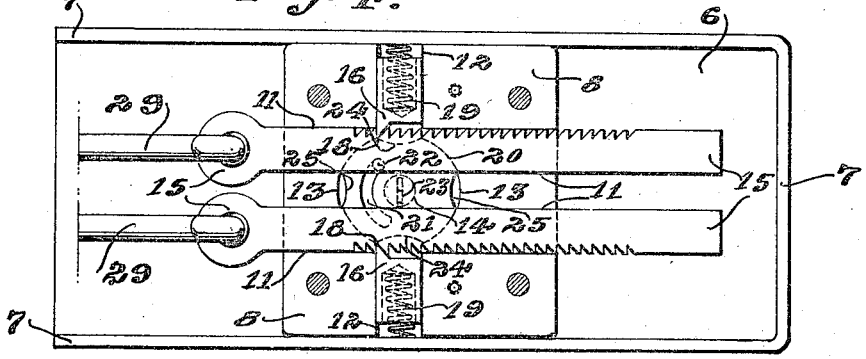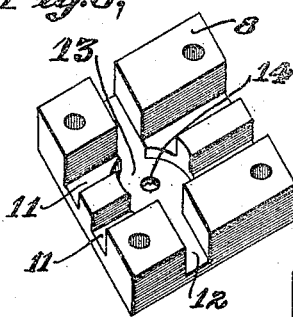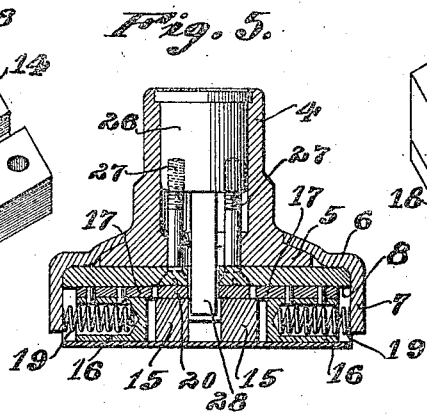

Patented Oct. 28, 1924.

1,513,218

UNITED STATES PATENT OFFICE.

THOMAS N. BURGHART, OF PHILADELPHIA, PENNSYLVANIA.

AUTOMOBILE LOCK.

Application filed September 12, 1922. Serial No. 587,705.

*To all whom it may concern:*

Be it known that I, THOMAS N. BURGHART, a citizen of the United States, residing at Philadelphia, in the county of Philadelphia and State of Pennsylvania, have invented certain new and useful Improvements in Automobile Locks, of which the following is a specification.

The object of my invention is to provide simple and effective mechanism for locking automobiles to prevent unauthorized use.

This object, and other advantageous ends which will be described hereinafter, I attain in the following manner, reference being had to the accompanying drawings, in which—

Figure 8:
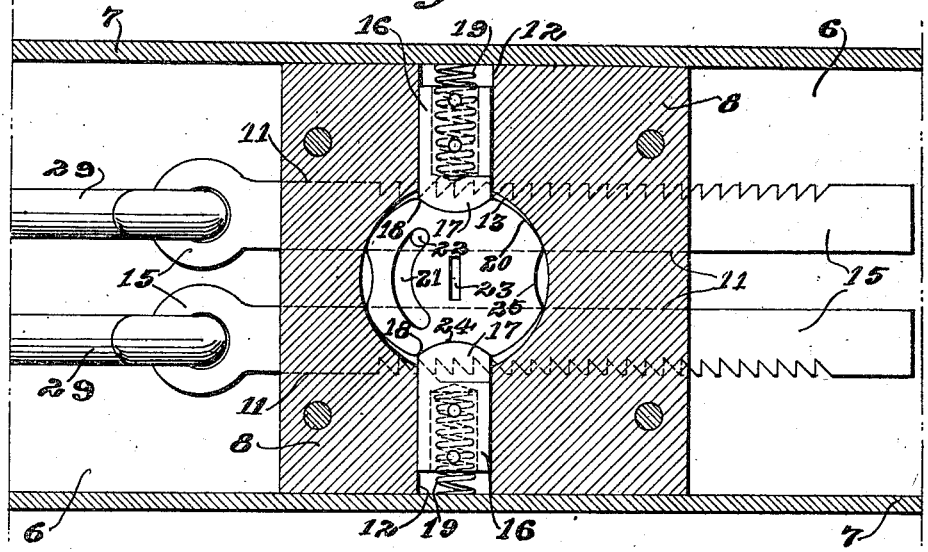
Figure 9:
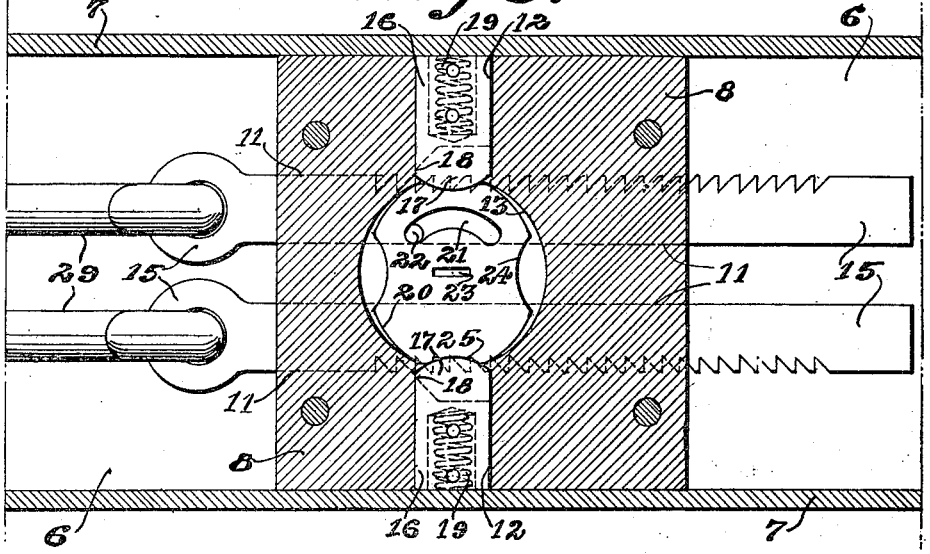

Figure 1 is a fragmentary elevation, partly in section showing my invention applied to an automobile, Figure 2 is a top plan view of my locking device, Figure 3 a vertical sectional view on the line 3—3 of Figure 2, Figure 4 a horizontal sectional view on the line 4—4 of Figure 3, Figure 5 a vertical sectional view on the line 5—5 of Figure 3, Figure 6 a perspective detail of a guide block, Figure 7 a perspective detail of a pawl member, Figure 8 a horizontal section on the line 6—6 of Figure 3, showing the parts in locking position, and Figure 9 a like view showing the parts in unlocked position.

Referring to the drawings, the numeral 1 designates the floor board of an automobile, 2 the brake lever, 3 the clutch lever, 4 a hollow standard taking through an opening in the floor and provided at its base with an outwardly projecting flange 5 through which it is riveted, or otherwise secured, to a housing plate 6 having a downwardly projecting wall 7 on its sides and one end, and 8 a guide block enclosed by the depending wall of housing plate 6, and riveted or otherwise secured to an angle plate 9 which is secured to a part of the chassis as indicated at 10. The guide plate has in its under face two parallel guideways 11, a transverse guideway 12, a central circular recess 13 and an aperture 14. The parallel guideways 11 embrace slidable plates 15 each provided on its outer edge with a series of notches. A hollow pawl member 16 is slidably mounted in each end of the transverse guideway. Each of these pawl members has, at its inner end, a beveled face 17 and a detent 18 adapted to engage in the notches of rack bars 15. A spring 19, positioned within the hollow pawl member and having a bearing against the wall of the housing, presses the detent inward. A disk cam 20 is seated in recess 13. This cam has a curved slot 21 adapted to receive pins 22, projecting from the rack bars, and a key slot 23. The face of the cam is provided with two opposite concave recesses 24, and two opposite concave recesses 25 of less depth than recesses 24. A lock member 26 is supported in standard 4 by screws 27 and is equipped with members which permit insertion of a correspondingly designed key 28, but preclude insertion of a key of any other design. The rack bars 15 are shown as connected by links 29 with the brake lever 32 and clutch lever 33, but may be connected with any automobile member movement of which is essential to operation of the car. A slotted cap 30 takes over the top of standard 4, and extends sufficiently above the standard to protect the key against accidental injury when it is left in position for use.

When the lock is not in use the beveled faces 17 of the pawl member are seated in the recesses 25 in the face of cam 20. These recesses are not of sufficient depth to allow detents 18 to engage with the rack bars but serve to hold the cam against accidental rotation. When the car is to be locked, key 28, which is of sufficient length to engage with cam 20, is inserted, its inner end engaged with key slot 23 and the cam rotated until recesses 24 register with the beveled faces of the pawl members. These recesses are sufficiently deep to permit detents 18 to engage with the rack bars and the springs force them into engagement and hold the rack bars locked against movement until the detents are disengaged by rotation of the cam by the key.

Protection may be afforded by use of a single rack bar and pawl member but I prefer to use the duplicate construction.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. An automobile lock including a slidably mounted rack bar connected with an operative member of the automobile; a cam having a recess in its face; a spring-pressed member, slidable in the casing transversely to the rack bar, having a beveled face adapted to ride on the face of the cam and a detent adapted to engage a notch in the rack bar when the beveled face registers with the recess, and means for rotatably moving the cam.

2. An automobile lock including a slidably mounted rack bar connected with an operative member of the automobile; a cam having a recess in its face; a hollow pawl member, slidable in the casing transversely to the rack bar, having a beveled face adapted to ride on the face of the cam and a detent adapted to engage a notch in the rack bar when the beveled face registers with the recess; a spring enclosed by the pawl member and normally pressing it into engagement, and means for actuating the cam.

3. An automobile lock including slidably mounted rack bars each connected with an operating member of the automobile; a disk-cam having recesses in its face; spring-pressed members, slidable in the casing transversely to the rack bars, each having a beveled face adapted to ride on the face of the cam and a detent adapted to engage a notch in a rack bar when the beveled face registers with a recess in the cam, and means for rotatably moving the cam.

4. An automobile lock including slidably mounted rack bars each connected with an operating member of the automobile; a disk-cam having opposed recesses in its face and opposed recesses of less depth; spring-pressed members, slidable in the casing transversely to the rack bars, each having a beveled face adapted to ride on the face of the cam and a detent adapted to engage a notch in a rack bar when the beveled face registers with one of the deeper recesses but to be held out of engagement when the beveled face registers with one of the lesser recesses.

5. An automobile lock including two slidably mounted rack bars, one connected with the clutch lever and the other with the brake lever of the automobile; a disk-cam having recesses in its face; spring-pressed members, slidable in the casing transversely to the rack bars, each having a beveled face adapted to ride on the face of the cam and a detent adapted to engage a notch in a rack bar when the beveled face registers with a recess in the cam, and means for rotatably moving the cam.

6. An automobile lock including a housing plate; a guide block secured therein having parallel guideways and a transverse guideway and a recess for a cam; rack bars slidably mounted in the parallel guideways and each connected with an operating member of the automobile; a cam rotatably seated in the recess and having opposed recesses; spring-pressed pawl members, slidably mounted in the transverse guideway, each having a beveled face adapted to ride on the face of the cam, and a detent adapted to engage a notch in a rack bar when the beveled face registers with a recess in the cam, and means for rotatably moving the cam.

7. An automobile lock including a slidably mounted rack bar; a cam having a recess in its face; a spring-pressed member, slidable in the casing transversely to the rack bar, having a beveled face adapted to ride on the face of the cam; key-actuated means for engaging the lock members; a hollow standard; a key adapted to be engaged through the standard, and a protecting cap on the standard.

In testimony whereof I have signed my name to this specification in the presence of two subscribing witnesses.

THOMAS N. BURGHART.

Witnesses:
CHAS. E. POTTS,
ELIZABETH GARBE.